May 27, 1924.
E. C. WENTE
ELECTRICAL TESTING SYSTEM
Filed April 7, 1921
1,495,466
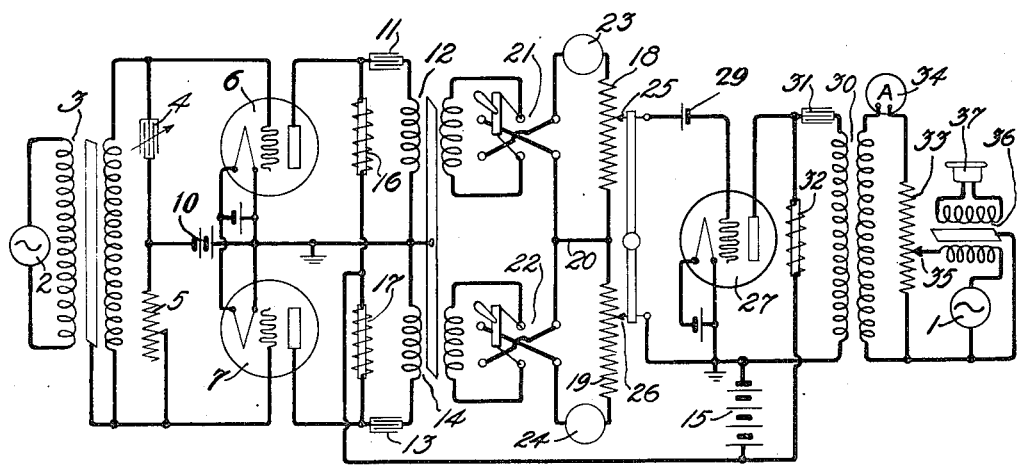
Inventor:
Edward C. Wente.
by Joel Ch. Palmer
Atty.

Patented May 27, 1924.

1,495,466

UNITED STATES PATENT OFFICE.

EDWARD C. WENTE, OF NEW YORK, N. Y., ASSIGNOR TO WESTERN ELECTRIC COMPANY, INCORPORATED, OF NEW YORK, N. Y., A CORPORATION OF NEW YORK.

ELECTRICAL TESTING SYSTEM.

Application filed April 7, 1921. Serial No. 459,245.

*To all whom it may concern:*

Be it known that I, EDWARD C. WENTE, a citizen of the United States, residing at New York, in the county of New York, State of New York, have invented certain new and useful Improvements in Electrical Testing Systems, of which the following is a full, clear, concise, and exact description.

This invention relates in general to electrical testing systems and more particularly to a method and system for measuring the phase angle and voltage magnitude of small alternating currents.

This invention may be more specifically described as an alternating current potentiometer and as such is a device for measuring an electromotive force in which a known electromotive force is made to oppose an unknown electromotive force. When no current flows in the circuit the two voltages are equal to each other.

For measuring a direct current electromotive force, it is necessary to make an adjustment only of the magnitude and direction of the potential drop. In the case of an alternating current electromotive force, however, both the magnitude and phase of the compensating voltage must have the right values before the current is reduced to zero. To measure alternating electromotive forces by the potentiometer method it is therefore necessary to have an arrangement whereby the magnitude and phase of the compensating electromotive force may be varied independently.

Since an alternating current electromotive force is a vector quantity it may be expressed either in the form of a magnitude and a phase angle or as the resultant of two vectors at right angles to each other, e. g., as $E \angle \theta$ or as $E_1 + jE_2$. In almost all measurements for which an alternating current potentiometer can be used to advantage, the problem is to find the ratio of two voltages, but to obtain the ratio of two vector quantities, it is necessary first to express them in the form $E \angle \theta$. It is therefore a great convenience if the potentiometer readings are given directly in this form. In methods heretofore used, for determining these quantities, cumbersome formulæ have been employed involving the frequency of the current source. Naturally these potentiometers are not adapted for making rapidly a series of measurements at different frequencies. Besides being inconvenient it is doubtful whether they can be constructed so as to be sufficiently accurate for general measurements for frequencies above three or four thousand cycles per second. In none of them is the compensating potential difference supplied by a simple slide wire as in the case of the ordinary type of direct current potentiometer, but by a slide wire in series with some form of air core inductance. This arrangement introduces several sources of inaccuracies. The magnetic field set up by the currents in the inductance coils may induce electromotive forces in other parts of the circuit; electromotive forces may be induced in the air core inductance by stray magnetic fields of the testing frequency; and there may be stray currents of considerable magnitude because of capacity to ground of different parts of the circuit and distributed capacity between the windings of the inductance coils.

It is the object of this invention to provide a method and apparatus arrangement for measuring small potentials and their phase relation, which shall be accurate over a large range of frequencies, and convenient to operate.

The method employed in the invention consists in generating two currents of equal magnitude in quadrature with each other, combining these currents in adjustable proportional magnitudes and direction so that the resultant current varies in its phase but remains of constant magnitude, and balancing the current adjustable as to phase against the current of the potential to be measured by adjusting the resistance of the circuit of the adjustable current. The balance of the currents may be ascertained by means of a telephone receiver, vibration galvanometer heterodyne, thermo-couple or any suitable device for detecting current, in the circuit of which the potential is to be measured. The potential is then the product of the resistance and the current measured by a suitable device in the measuring circuit.

The two currents in quadrature are generated preferably by thermionic electron discharge devices under the control of the same current source, the phase of one being altered by a reactance element in cooperative relation with the corresponding discharge controlling means. The magnitude of the generated current may be controlled by adjusting the reactance element. These currents after being equalized are recombined through a slide wire resistance in such proportions that the resultant current has the same amplitude regardless of the phase angle through which the vector rotates. This current of adjustable phase is then amplified by means of a thermionic amplifier, and by means of a transformer is balanced against the current of the circuit whose potential is to be measured.

Other objects and advantages will become apparent by reference to the accompanying drawing which shows the diagrammatic circuit arrangement in its preferred form.

As in the case of all alternating current potentiometers it is necessary that the measuring source of current be of the same frequency as the potential to be measured. Preferably the same original source is employed as most convenient although it is not impossible or inconceivable that two current sources may be adjusted to exactly the same frequency and substantially in phase with each other. Thus we have a current source 1 of which the potential is to be measured and a current source 2 of the same frequency with respect to which the phase of source 1 is also to be determined.

Associated with current source 2 is a transformer 3 preferably of the grounded shield type. The secondary of transformer 3 is connected to a condenser 4 and a resistance 5, in series. Both the condenser 4 and the resistance 5 are adjustable, the reason for which will appear later. The grid of thermionic vacuum tube 6 is connected in parallel with the condenser 4 and the grid of thermionic vacuum tube 7, in parallel with the resistance 5. The vacuum tubes 6 and 7 are alike as nearly as possible and have a high input impedance. Their amplification constants are therefore rather low. The impedances due to resistance 5 and condenser 4 are much smaller than that of the vacuum tubes 6 and 7 and the differences of potential across the resistance 5 and the condenser 4 are substantially ninety degrees out of phase. Other things being equal the output of the vacuum tubes 6 and 7 will also be in quadrature. A slight negative charge is maintained on the grids of both vacuum tubes 6 and 7 by means of direct current source 10 in order to maintain the original wave form in the output circuits. The output circuit of vacuum tube 6 operates through a condenser 11 into transformer 12, and similarly the output circuit of vacuum tube 7 operates through condenser 13 into transformer 14. Plate current is supplied to vacuum tubes 6 and 7 by a common current source 15 through inductance coils 16 and 17 respectively. Transformers 12 and 14 are constructed as nearly alike as possible as are also condensers 11 and 13. The secondary windings of transformers 12 and 14 are connected to two equal resistances 18 and 19 respectively and have a common branch circuit 20. Reversing switches 21 and 22 are provided to control the direction of current flow in the resistances 18 and 19 respectively. Winding 23 of a differential galvanometer is included in series with resistance 18 to indicate the amount of current flowing in its circuit. For the same purpose, the other winding 24 of the differential galvanometer is included in series with resistance 19. By adjusting condenser 4 and resistance 5 the magnitudes of these currents may be equalized and such equalization will be indicated on the differential galvanometer. By means of the sliding contacts 25 and 26 cooperating with resistance elements 18 and 19 respectively a portion of the current flowing through the resistance elements 18 and 19 is shunted across the input of a vacuum tube amplifier 27. The contacts 25 and 26 are mechanically connected together so that the motion of one is accompanied by an equal movement of the other. A current source 29 maintains a slight negative charge on the grid of the vacuum tube 27. The output circuit of vacuum tube 27 includes a transformer 30 and a condenser 31. Plate current is supplied from the current source 15 through a high impedance 32. The secondary of transformer 30 is connected with a potentiometer slide wire resistance 33 and an ammeter 34. The current source whose potential is to be measured is connected in shunt with the resistance 33 through the sliding contact 35. In circuit with the current source is a transformer 36, the secondary of which is connected with a current indicating device 37, which may be a telephone receiver, thermocouple or other means depending upon the frequency of current being measured.

The arrangement of the potentiometer has been described above very briefly in order that its general plan may be grasped before describing in detail the various elements. It is believed that certain of these details warrant more complete explanation.

At low frequencies the impedances of the stopping condensers 11, 13 and 31 may be comparable with the input impedances of the transformers 12, 14 and 30 respectively. Condensers 11 and 13 should therefore have very nearly equal capacities. For the same reason the impedances of the coils 16 and 17, should be large and have very nearly the same values. The impedance of coil 32 should also be large.

The resistances 18 and 19 are not uniform throughout their length since it is apparent that when the position of the contacts 25 and 26 is changed, the voltage impressed on the vacuum tube 27 will change in magnitude since the currents in these resistances are 90° out of phase. These resistances are proportioned so that the magnitude of this voltage is the same for all positions of the contacts. If "1" be the length of the resistance element, and $\frac{x}{1}$ be the fractional part of the distance, 1, traversed by contact 25, and $\frac{1-x}{1}$ the fractional part of the distance contact 26 has moved from the corresponding end of resistance 19, then the resistance between contact 25 and the common branch 20 should be $R \cos \frac{x}{e} \frac{\pi}{2}$, and between contact 26 and the common branch 20, $R \sin \frac{x}{e} \frac{\pi}{2}$, where R is the resistance of one of the elements 18 or 19. The voltage between contacts 25 and 26 will then be $IR \cos \frac{x}{e} \frac{\pi}{2} \sin pt + IR \sin \frac{x}{e} \frac{\pi}{2} \cos pt = IR \sin \left(pt + \frac{x}{e} \frac{\pi}{2}\right)$, where I sin $pt$ and I cos $pt$ are the currents in resistances 18 and 19, respectively. Hence, in this case the magnitude of the voltage between contacts 25 and 26 is constant and the scale of phase is linear. This then gives a convenient way of varying the phase of the current in potentiometer resistance 33 without varying its effective magnitude.

The current in resistances 18 and 19 may be shifted 180° in phase by the use of the reversing switches 21 and 22. By means of these switches and the slide wire contacts, it is evident that the phase of the current in resistance 33 may be shifted at will through all quadrants.

The current from source 1 may be balanced by proper adjustment of the phase angle as above described, and by adjustment of the sliding contact 35. Such balance is indicated when no current flows through the current detector 37. The potential of source 1 is then calculated as the product of the current as indicated by the ammeter 34 and that portion of the resistance below contact 35.

Instead of condenser 4 a mutual inductance may be used. It is evident that, theoretically at least, the voltages impressed on the vacuum tubes 6 and 7 will be 90° out of phase as in the preceding arrangement. However this is less desirable because the voltage impressed on vacuum tube 6 will in practice not be 90° out of phase with that impressed on vacuum tube 7 on account of the distributed capacity in the induction coils which cannot be avoided even if the coils are wound with the greatest care. A further disadvantage of induction coils as compared with a condenser is that the magnetic field surrounding the coils may induce electromotive forces in other parts of the circuit and thus impair the precision of the apparatus.

Other modifications will occur to those skilled in the art and such are contemplated in the claims.

What is claimed is:

1. In an electrical device for measuring alternating potentials, a source of single phase alternating current, thermionic means to produce therefrom two currents of adjustable magnitude and constant quadrature phase relation, thermionic means to utilize said quadrature currents to produce a single current of constant magnitude, adjustable phase and of the same wave form as the source of single phase current, means to transform such current into a corresponding alternating voltage, means to balance a portion of such corresponding voltage with a second alternating voltage of equal frequency, the magnitude of which is to be measured, and means for determining when said voltages are balanced and in phase.

2. In an electrical potentiometer, a source of alternating current whose potential is to be measured, a second source of current of the same frequency as the first source, thermionic means to produce therefrom two currents in quadrature each having the same wave form, means to combine the two quadrature currents in proportions such that the resulting current is of constant effective magnitude but of adjustable phase, means to adjustably associate a portion of such resulting current with and in opposition to the first source of current, and means to determine when a balance is obtained between the first source of current and such resulting current.

3. In an electrical potentiometer, an alternating current potential to be measured, a source of current of the same frequency as the potential to be measured, means associated with said source of current to set up current in phase with the source, means for setting up current in quadrature therewith, means for combining the currents so set up to produce a current of constant effective magnitude and adjustable phase, a circuit directing such current through a resistance, means to balance the voltage drop over a portion of such resistance with the potential to be measured, and means to determine when said voltage drop and said potential are balanced and in phase.

4. In an electrical potentiometer, a source of alternating current whose potential is to be measured, a source of current of the same frequency as the first said source, a pair of thermionic devices associated with the second source of current to produce two currents in quadrature with each other and having a definite phase relation to the second source, means to combine such currents in quadrature to produce a current of adjustable phase and constant effective magnitude, and means to balance a portion of current so produced against the source whose potential is to be measured.

5. A device for producing a current of adjustable phase and constant effective magnitude comprising a source of alternating current, means for producing therefrom two currents in quadrature with each other, a circuit for each such current, both circuits having a common branch, similar resistance elements for each of said circuits, and a shunt circuit adjustably including portions of both said resistance elements.

6. In an electrical potentiometer, a source of variable current whose potential is to be measured, a source of current of the same frequency as the first source, a pair of thermionic relays one of which is associated through a resistance element, and the other through a capicitance, with the second said source, an output circuit for each of the thermionic relays, a shunt circuit for combining the currents of the two output circuits, means for simultaneously adjusting the relative amplitude of the currents flowing in the two output circuits, amplifying means associated with the shunt circuit, an output circuit for said amplifying means, an adjustable shunt resistance associating the source of current whose potential is to be measured with the output circuit of the amplifying means, and detector means associated with the source of current whose potential is to be measured to indicate the flow of current therefrom.

7. The method of measuring alternating current potentials which comprises, setting up two currents in quadrature with each other, combining the currents so set up to produce a current of adjustable phase, directing that current through a resistance and balancing the voltage drop of the current of adjustable phase against the potential to be measured.

8. The method of determining the phase and potential of a variable current, which comprises setting up two currents in quadrature with each other and having the same frequency as the current whose potential is to be measured, combining the two currents so set up to produce a current of adjustable phase and constant effective magnitude, directing that current through a resistance and balancing a portion of the voltage drop of the current of adjustable phase against the potential to be determined.

In witness whereof, I hereunto subscribe my name this 4th day of April, A. D. 1921.

EDWARD C. WENTE.